United States Patent
Ito

(10) Patent No.: US 6,642,841 B2
(45) Date of Patent: Nov. 4, 2003

(54) ENGINE PROTECTING APPARATUS FOR VEHICLE

(75) Inventor: Nobuyasu Ito, Kariya (JP)

(73) Assignee: Kabushiki Kaisha Toyota Jidoshokki, Kariya (JP)

( * ) Notice: Subject to any disclaimer, the term of this patent is extended or adjusted under 35 U.S.C. 154(b) by 0 days.

(21) Appl. No.: 10/015,730

(22) Filed: Nov. 1, 2001

(65) Prior Publication Data

US 2002/0186127 A1 Dec. 12, 2002

(30) Foreign Application Priority Data

Jun. 6, 2001 (JP) ........................................ 2001-171350

(51) Int. Cl.[7] ................................................ D60Q 1/00
(52) U.S. Cl. ..................... 340/441; 340/438; 340/439; 340/449; 340/450.3; 123/41.14; 123/179.5; 123/198 DC; 307/10.6
(58) Field of Search ................................ 340/441, 451, 340/452, 449, 426, 439, 459, 450.3, 438; 307/10.2, 10.3, 10.6; 123/41.14, 179.5, 198 D, 198 DB, 198 DC; 180/271

(56) References Cited

U.S. PATENT DOCUMENTS

| 3,602,207 A | * | 8/1971 | Kilmer ..................... 123/179.1 |
|---|---|---|---|
| 4,136,329 A | * | 1/1979 | Trobert ........................ 340/459 |
| 4,526,140 A | * | 7/1985 | Monigold et al. ........ 123/196 S |
| 4,878,042 A | * | 10/1989 | Eggiman et al. ............ 340/439 |
| 5,307,048 A | * | 4/1994 | Sonders ....................... 180/287 |
| 6,131,539 A | * | 10/2000 | Thomas .................... 123/41.15 |

* cited by examiner

*Primary Examiner*—Benjamin C. Lee
(74) *Attorney, Agent, or Firm*—Morgan & Finnegan, LLP

(57) ABSTRACT

A vehicle having a power assist device and an engine protecting apparatus is capable of steering and braking after any abnormality of the engine is detected. The engine protecting apparatus includes a battery, a key switch, a condition switch, a timer and a timer-operative switch. The battery supplies an electric current to the ignition circuit of the engine. The key switch is disposed between the battery and the ignition circuit and has an ignition terminal. The condition switch turns on and off based on engine conditions. The condition switch is connected to the ignition terminal of the key switch. The timer is connected to the ignition terminal of the key switch and has a predetermined period of time. The timer measures a time period from when the condition switch is turned on. The timer-operative switch is actuated by the timer. The timer-operative switch interrupts the electric current flowing to the ignition circuit when the timer measures the predetermined time period. Therefore, the engine continues to run for a while even after an engine abnormality is detected.

5 Claims, 3 Drawing Sheets

ENGINE PROTECTING APPARATUS FOR VEHICLE

BACKGROUND OF THE INVENTION

The present invention relates to an engine protecting apparatus for a vehicle which stops an engine when an abnormality occurs in the engine.

Several kinds of vehicles are equipped with a sensor/meter for displaying the operating condition of the engine, for example, cooling water temperature, lubricating oil pressure and oil temperature. An operator of the vehicle determines whether the abnormality of the engine exists or not based on values displayed on the meters. If an abnormality exists, the vehicle operator must address the malfunction in order to prevent accidents.

However, when the operator is distracted to work hard, or when the operator is negligent in addressing the abnormality, the operator continues operating the vehicle without fixing the problem and possible engine change results. In order to prevent such a risk caused by the abnormality of the engine, a technique for stopping an engine automatically when the error occurs in the engine was proposed.

FIG. 3 shows a circuit diagram illustrating electrical components of a conventional engine protecting apparatus. A battery 50 is connected at its negative (minus) terminal to the ground (GND) and at its positive (plus) terminal to a key switch 51. An ignition terminal (IG) of the key switch 51 is connected to an ignition coil 53 disposed in an ignition circuit via a relay 52. A starter terminal (ST) of the key switch is connected to a starter motor (not shown). Each of a lubricating oil pressure switch 54 and a cooling water temperature switch 55 is connected in series to a warning lamp 56 and also connected to a relay 59 via diodes 57, 58. The relay 59 is connected to the relay 52 via a relay 61 which closes when a timer 60, which de-actuates the engine protecting apparatus, times up.

In the above conventional apparatus, when the abnormality of the engine occurs, and when at least one of the cooling water temperature switch 55 and the lubricating oil pressure switch 54 is actuated, the warning lamp 56 lights. Meanwhile, the relay 52 opens to stop the engine immediately. Upon starting the engine, the timer 60 and the relay 61 make the engine protecting apparatus in an unoperated condition until the lubricating oil pressure reaches its predetermined value.

However, when the conventional engine protecting apparatus mentioned above is installed in the vehicle having the power assist device, and when the engine stops due to abnormality of the engine, i.e. over heat, during the vehicle moving, the power assist device is de-actuated immediately. Therefore, braking and steering is deteriorated and moving the vehicle to a desired place for parking is difficult.

SUMMARY OF THE INVENTION

It is an aspect of the present invention to provide a vehicle including a power assist device with an engine protecting apparatus that makes it possible to steer and brake the vehicle, even after any abnormality of the engine is detected.

In order to attain the above aspect, the engine protecting apparatus for the vehicle includes a battery, a key switch, a condition switch, a timer and a timer-operative switch. The battery supplies an electric current to the ignition circuit of the engine. The key switch is disposed between the battery and the ignition circuit and has an ignition terminal. The condition switch turns on and off based on engine conditions. The condition switch is connected to the ignition terminal of the key switch. The timer is operatively connected to the ignition terminal of the key switch and has a predetermined period of time. The timer measures a time period from the condition switch turned on. The timer-operative switch is actuated by the timer. The timer-operative switch interrupts the electric current flowing to the ignition circuit when the timer measures the predetermined time period. Therefore, the engine continues to run for a while even after something abnormal is detected by the condition switch, so that the operator can move the vehicle to the safe parking place until the engine stops.

BRIEF DESCRIPTION OF THE DRAWINGS

The features of the present invention that are believed to be novel are set forth in the appended claims, specification and accompanying drawings. The invention together with other objects and advantages thereof, may best be understood by reference to the following description of the presently preferred embodiments together with the accompanying drawings in which:

DETAILED DESCRIPTION OF THE PREFERRED EMBODIMENTS

[First Embodiment]

A first embodiment of the present invention will now be described referring to FIG. 1.

Figure 1:
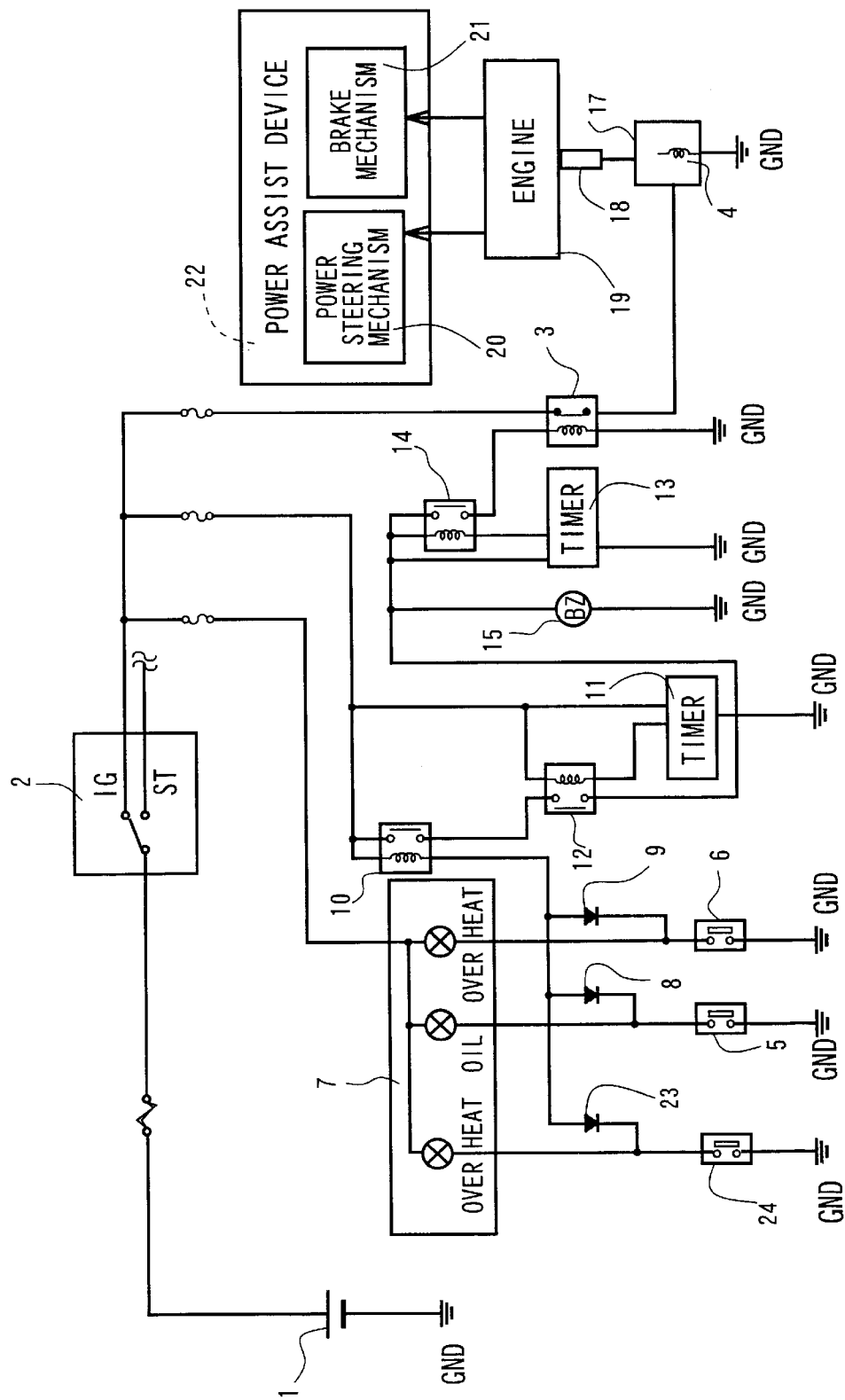
FIG. 1 is a circuit diagram of a first embodiment of the present invention.

FIG. 1 shows an electrical circuit of the engine protecting apparatus applied to a combustion engine 19, which is a driving power source of a power assist type brake mechanism 21 and a power steering mechanism 20.

A battery 1 as an electrical power supply has a negative (minus) terminal connected to a ground (GND) and a positive (plus) terminal connected to a key switch 2. The key switch 2 has an ignition terminal (IG) connected to an ignition circuit 17 and a starter terminal (ST) connected to a starter motor which is not shown. The ignition circuit 17 is provided with an ignition coil 4 which supplies via a normal close relay 3 high voltage to a spark plug 18.

The ignition terminal (IG) is also connected to a lubricating oil pressure switch 5, a cooling water temperature switch 6 and an oil temperature switch 24 for an oil in a torque converter (not shown). The switches 5, 6, 24 are each connected in series to a warning lamp 7. The lamp 7 includes indicators for the respective switches 5, 6, 24. A normally opened relay 10 interconnects by its relay coil, in parallel with the lamp 7, the ignition terminal (IG) and the switches 5, 6, 24. Diodes 8, 9 and 23 are provided between the relay 10 and the respective switches 5, 6, 24. The relay 10 is also connected by its normally opened switch to the relay 3 (relay coil) through timer-operated relays 12 and 14. A timer 11 is provided to measure a predetermined period of time, for example thirteen seconds, after the engine starts. The relay 12, which is normally opened, is closed by the timer 11 after measuring the predetermined time period. A timer 13 is provided to start measuring a predetermined period of time, for example thirteen seconds, from the time when either one of the condition switches 5, 6, 24 is actuated and an electrical current flows through the timer 13. The relay 14, which is normally opened, is closed by the timer 13 after measurement of the predetermined time period. An alarm buzzer 15 is provided between the relays 12, 14.

The function of the engine protecting apparatus in the present invention is explained as follows. Upon starting the engine 19, the timer 11 starts counting the time period when the key switch 2 is set to the ignition terminal IG. The relay 12 keeps the open state until the timer 11 times up. Even when the lubricating oil pressure switch 5 is actuated in a while due to the condition that the lubricating oil pressure does not reach the predetermined value, the engine protecting apparatus does not actuate. Therefore, the engine protecting apparatus does not prevent the engine from starting. Setting the key switch 2 connected to the starter terminal (ST) actuates the starter motor. Thereafter, the engine starts its operation. When the timer 11 times out, the lubricating oil pressure reaches its predetermined value. Thereby, the lubricating oil pressure switch 5 is switched off. Therefore, the operation of the engine continues without any disturbance. After the timer 11 times out, the relay 12 keeps its closed state.

Next, when the abnormality of the engine occurs while the vehicle is operated, at least one of the lubricating oil pressure switch 5, the cooling water temperature switch 6, is actuated. Thereby, a warning lamp 7 lights in order to warn the operator of the abnormality. Meanwhile, an electric current flows to the relay 10 and closes it. When the relay 10 is closed, the electric current is supplied to the alarm buzzer 15 via the relay 12. Thereby, the buzzer 15 sounds in order to warn the operator of the abnormality. Accordingly, the electric current activates the timer 13. After the timer 13 reaches the preset time, the normally opened relay 14 closes. On the other hand, the normally closed relay 3 opens. Therefore, the electric current supplied to the ignition coil 4 is interrupted. As a result, the engine 19 is forced to shut down. After the warning lamp and buzzer is actuated, the operator can operate the vehicle normally until the engine 19 is forced to stop.

The effect expected from the above first embodiment is described as follows.

Even though the abnormality of the engine occurs, the operation of the engine continues during the predetermined time period after the operator is warned. The brake mechanism and the power steering mechanism are still operable during that time, therefore the engine protecting apparatus does not disturb the operator to operate the vehicle normally in order to move the vehicle to park at a safe place.

[Second Embodiment]

A second embodiment of the present invention will now be described with reference to FIG. 2. Like or the same reference numerals denote components that are like or the same as the corresponding components of the first embodiment.

A relay 16 interconnects, by its normal close switch, the ignition terminal (IG) of the key switch 2 and the timer 11. The relay 16 has a relay coil to open the normal close switch thereof, the relay coil being connected to the starter terminal (ST) of the key switch 2. When the key switch 2 is switched over to the starter terminal (ST), and when the electric current is supplied to the starter motor thereafter, the relay 16 opens.

Upon starting the engine 19, when the key switch 2 is switched over to the ignition terminal (IG), the timer 11 starts counting. Furthermore, when the key switch 2 is switched over from the ignition terminal (IG) to the starter terminal (ST), the electric current is supplied to the starter motor. Due to the electric current supplied to the starter motor, the relay 16 opens. Thereafter, the relay 16 interrupts the electric current supplied to the timer 11 and the timer 13, by which the relay 14 opens. Since the relay 3 keeps closing, the electric current continues supplying to the ignition coil 4. Thereafter, when the engine 19 starts its operation, and when the key switch 2 is switched over to the ignition terminal (IG), the timer 11 starts counting again. At that time, since the power supply to the timer 11 is turned down once, a count value of the timer 11 is reset at zero.

The engine protecting apparatus of the second embodiment has following effects in addition to the effect of the first embodiment.

Until the engine 19 is smoothly started and is operated normally, that is the lubricating oil pressure reaches a predetermined value, the engine protecting apparatus is de-actuated. Therefore, upon starting the engine, the engine is not de-actuated by employing the engine protecting apparatus. The engine is smoothly started.

In the above first embodiment, if the key switch 2 keeps connecting to the ignition terminal (IG) awhile, not switched over to the starter terminal (ST), the timer 11 may time out. Therefore, it is possible that the engine does not start even when the key switch 2 is switched over and is connected to the starter terminal ST to actuate the starter motor, if the timer 11 times out in a condition that the oil pressure switch 5 is maintained ON before the engine starts. However, according to the second embodiment of the present invention, the engine protecting apparatus does not prevent the engine from starting smoothly because the count value of the timer 11 is reset at zero whenever the key switch 2 is switched over to the starter terminal (ST).

Furthermore, the present invention is not limited to the above embodiments. The present invention may be applied in the following way.

(1) In the above embodiments, the present invention is applied to a gasoline engine, however, the present invention may be applied to a diesel engine. In the present invention, in the case of using the diesel engine, an electromagnetic solenoid valve may be adopted to constitute an ignition circuit instead of an ignition coil. If the timer as a first counter is timed up, the electromagnetic solenoid valve is de-energized. The electromagnetic solenoid valve interrupts fuel supplied to the engine. Accordingly, the engine is forced to stop.

(2) The warning lamp and the alarm buzzer are exemplified as alarming means in the first and second embodiments, however, the warning means are not limited to the warning lamp and the buzzer. Other alarming means can be applied to the engine protecting apparatus of the present invention without using the alarm lamp and the alarm buzzer. For example, when the abnormality of the engine is detected in the cooling water temperature, the operator may be warned by the idle rotating condition of the engine.

Figure 2:
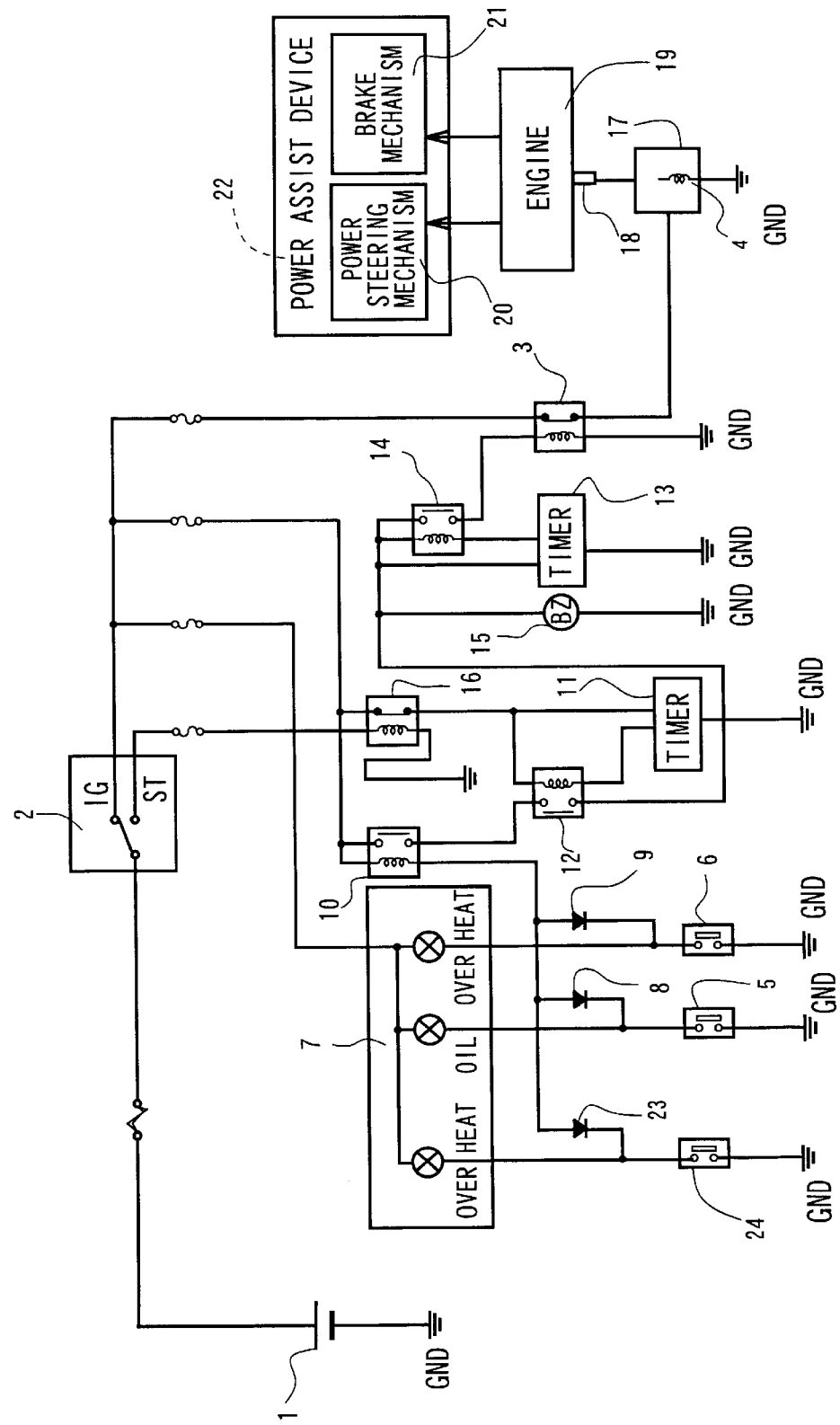
FIG. 2 is a circuit diagram of a second embodiment of the present invention.
Figure 3:
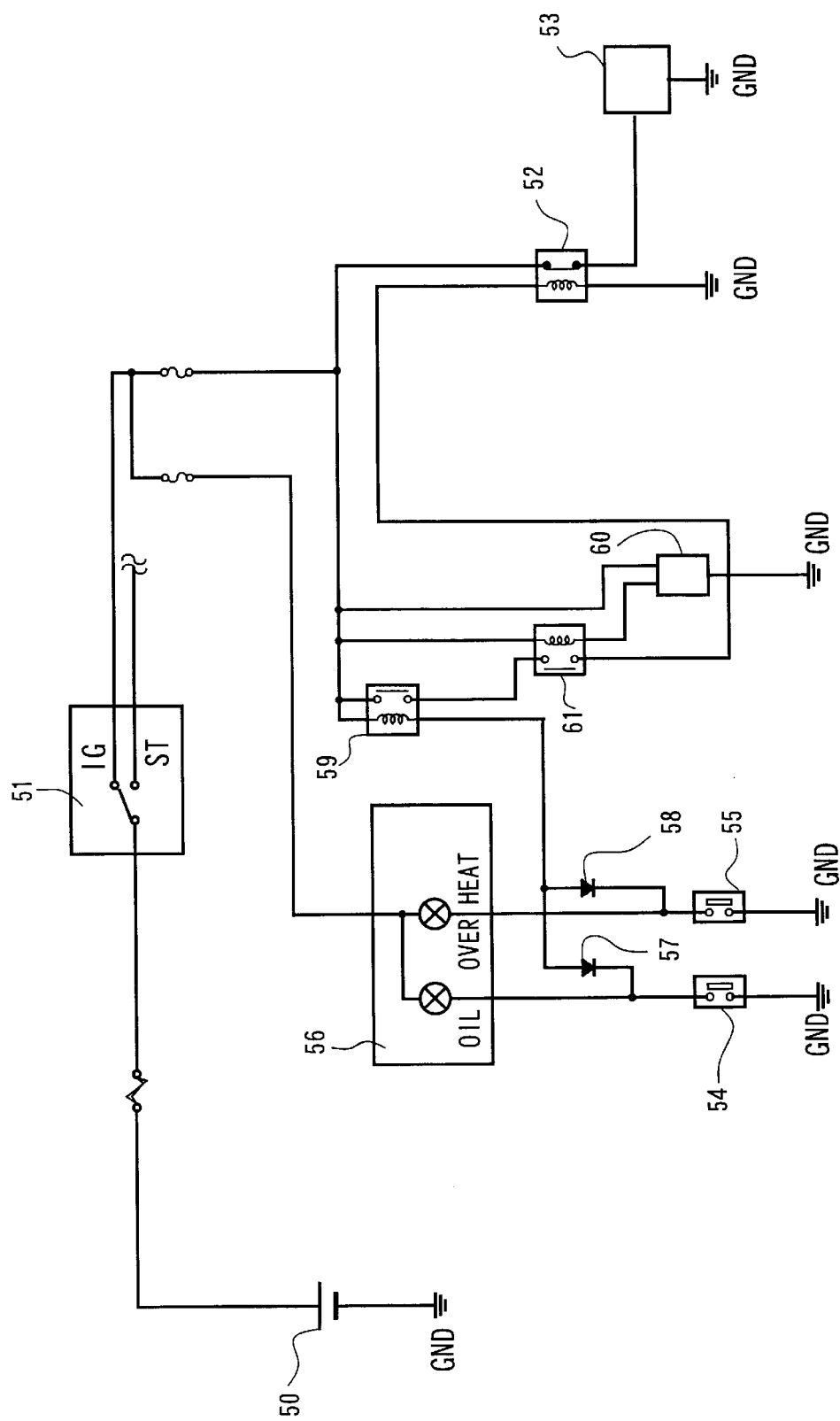
FIG. 3 is a circuit diagram of a prior art.

(3) The position of the alarm buzzer 15 indicated in FIGS. 1 and 2 may be changed to other proper positions.

(4) In the above first and second embodiments, the normally closed relay 3 as the first interrupting means and the normally opened relay 14 are applied in order to interrupt the electric current supplied to the ignition circuit when the relays 3 and 4 operate. However, the two relays may be integrated into one. For example, the normal close relay 3 in FIGS. 1 and 2 may be a timer-operative one opened by the timer 13, and the relay 14 can be omitted.

(5) In the above first and second embodiments, the abnormality of the engine is detected in the lubricating oil pressure, the cooling water temperature and the oil temperature in the torque converter, however, the means for detecting the abnormality of the engine is not limited to them. For example, the abnormality of the engine may be detected in the oil temperature in the torque converter and so on.

(6) In the above first and second embodiments, the predetermined time period of the timers are set at thirteen seconds, however, the length of the predetermined time period is not limited. The length may be changed into other proper durations based on each situation and condition of the vehicle.

As described above, in the present invention, even if the abnormality occurs in the engine, the engine protecting apparatus of the present invention does not force the engine to stop immediately, after the engine protecting apparatus detects the abnormality. Therefore, the engine can continuously operate during the predetermined time period in which the operator can operate the vehicle in a safe condition. The engine protecting apparatus enables the operator to operate the vehicle continuously in order to move the vehicle to park at a safe place, because the power assisted brake and steering still work normally for a period of time.

The present examples and embodiments are to be considered as illustrative and not restrictive and the invention is not to be limited to the details given herein but may be modified within the scope of the appended claims.

What is claimed is:

1. An engine protecting apparatus for a vehicle having an ignition circuit to start an engine thereof, the apparatus comprising:

a battery supplying an electric current to the ignition circuit;

a key switch disposed between the battery and the ignition circuit, the key switch having an ignition terminal;

a condition switch turning on and off based on engine conditions, the condition switch being connected to the ignition terminal of the key switch;

a first timer operatively connected to the ignition terminal of the key switch, the timer having a predetermined period of time and measuring a time period from when the condition switch is turned on;

a first timer-operative switch actuated by the timer, the timer-operative switch interrupting an electric current flowing to the ignition circuit when the timer measures the predetermined time period, whereby the engine stops after the predetermined time period from when the condition switch turned on;

a second timer directly connected to the ignition circuit, the second timer having a predetermined period of time and measuring a time period immediately after the key switch is turned to the ignition terminal;

a second timer-operative switch actuated by the second timer, the second timer-operative switch disconnecting the ignition terminal of the key switch from the first timer until the second timer measures the predetermined time period thereof; and a normally open type relay switch disposed between the ignition terminal of the key switch and the condition switch, the relay connecting the ignition terminal and the first timer when the condition switch turns on.

2. The apparatus according to claim 1, wherein the key switch has a starter terminal to start a starter motor, the apparatus further comprising a normally close type relay interconnecting the ignition terminal of the key switch and the second timer, the normally close type relay having a relay coil connected to the starter terminal and opening the relay to reset the second timer when the key switch is switched to the starter terminal.

3. The apparatus according to claim 1 further comprising an indicator connected to the condition switch, the indicator indicating the engine condition due to the condition switch operation.

4. The apparatus according to claim 3, wherein the indicator includes an alarm buzzer to inform an operator of the engine condition by its sound.

5. The apparatus according to claim 1, wherein the predetermined time period of the first timer and the predetermined time period of the second timer can be changed without replacing components of the circuit.

* * * * *